United States Patent [19]

Villax et al.

[11] Patent Number: 4,500,458

[45] Date of Patent: Feb. 19, 1985

[54] PROCESS FOR THE PREPARATION OF α-6-DEOXYTETRACYCLINES

[75] Inventors: Ivan Villax, Lisbon; Philip R. Page, Parede, both of Portugal

[73] Assignee: Plurichemie Anstalt, Vaduz, Liechtenstein

[21] Appl. No.: 458,067

[22] Filed: Jan. 14, 1983

[30] Foreign Application Priority Data

Jan. 19, 1982 [PT] Portugal .................................. 74303
Dec. 30, 1982 [PT] Portugal .................................. 76061

[51] Int. Cl.$^3$ ...................... C07C 103/19; B01J 31/04
[52] U.S. Cl. ............................. 260/351.5; 260/351.7; 502/166
[58] Field of Search .................. 260/351.5, 351.2; 252/429 R

[56] References Cited

U.S. PATENT DOCUMENTS

| | | | |
|---|---|---|---|
| 3,849,491 | 11/1974 | Villax et al. | 260/351.5 |
| 3,954,862 | 5/1976 | Morris, Jr. | 260/351.5 |
| 4,001,321 | 1/1977 | Faubl | 260/351.5 |
| 4,031,137 | 6/1977 | Schmitt, Jr. et al. | 260/351.5 |
| 4,207,258 | 6/1980 | Broggi et al. | 260/351.5 |

FOREIGN PATENT DOCUMENTS

| | | | |
|---|---|---|---|
| 668581 | 8/1963 | Canada | 260/351.5 |
| 2216268 | 1/1978 | France . | |
| 7401340 | 2/1973 | Netherlands | 260/351.5 |
| 1440372 | 6/1976 | United Kingdom . | |

OTHER PUBLICATIONS

U.S. Ser. No. 328,514 filed Feb. 1, 1973, Priority Document for France No. 2,216,268.
U.S. Ser. No. 368,066 filed Jun. 8, 1973, Priority Document for France No. 2,216,268.
U.S. Ser. No. 428,268 filed Dec. 6, 1973, Priority Document for France No. 2,216,268.

*Primary Examiner*—Glennon H. Hollrah
*Assistant Examiner*—Raymond K. Covington
*Attorney, Agent, or Firm*—Ostrolenk, Faber, Gerb & Soffen

[57] ABSTRACT

An improved process for the preparation of α-6-deoxytetracyclines and more particularly to the stereo specific hydrogenation of the 6-methylene group of 6-deoxy-6-demethyl-6-methylene-5-hydroxytetracyline and of its 11a-halo-analog, is described in which the catalyst is the reaction product of a rhodium salt or a complex with a hydrazine or salt thereof.

20 Claims, No Drawings

PROCESS FOR THE PREPARATION OF α-6-DEOXYTETRACYCLINES

The present invention refers to a new improved process for the preparation of α-6-deoxytetracyclines, more particularly to the stereospecific hydrogenation of the 6-methylene group of 6-deoxy-6-demethyl-6-methylene-5-hydroxytetracycline and of its 11a-halo analogue, and to the subsequent recovery of pure doxycycline as p-toluenesulphonate directly from the reaction mixture in a nearly stoichiometric yield.

Another feature of the present invention is that the amount of catalyst, expressed as metal, more specifically as rhodium, necessary to perform the hydrogenation of the exocyclic methylene group is considerably reduced in comparison to the teaching of the prior art, and therefore the process is very economical.

The α-isomer of 6-deoxy-5-hydroxytetracycline (doxycycline) was first isolated in pure form and described in U.S. Pat. No. 3,200,149, applied for in 1960. Subsequently, a considerable number of patents referred to improved processes for preparing doxycycline. However, none of them was stereospecific and the yields obtained lay between 8 and 64% until the discovery of the first homogeneous hydrogenation process.

U.S. Pat. No. 4,207,258 (Italian priority 1972) describes such homogeneous hydrogenation of 6-deoxy-6-demethyl-6-methylenetetracyclines, using a complex of rhodium with tertiary phosphine, arsine and stibine ligands with predominant formation of the α-isomer.

U.S. Pat. No. 3,962,331 (Italian priority 1973) extends the above process to the simultaneous reductive dehalogenation and hydrogenation of the exocyclic methylene group of 11a-halo-6-deoxy-6-demethyl-6-methylenetetracycline. Essentially the same processes, equivalent to the above two, are described in French Pat. No. 2,216,268 (U.S. priority 1973).

U.S. Pat. No. 3,954,862 (first filed in 1973) describes the hydrogenation of 6-deoxy-6-demethyl-6-methylenetetracyclines in the presence of rhodium metal, a tertiary phosphine and a promoter selected from strong acid or stannous chloride. Thus, this process prepares the catalyst, described in U.S. Pat. No. 4,207,258, in the reaction mixture, starting from rhodium metal and strong acid or stannous chloride, instead of the equivalent rhodium chloride.

Doxycycline is prepared by hydrogenation of 6-methylene-5-hydroxytetracycline, using cobalt carbonyl, triphenylphosphine and hydrochloric acid in U.S. Pat. No. 3,907,890 (filed in 1974).

U.S. Pat. No. 4,001,321 (filed in 1975) employs dicarboxylato (triphenylphosphine) rhodium (II) or dicarboxylato (substituted triphenylphophine) rhodium (II) to produce doxycycline by hydrogenation.

U.S. Pat. No. 3,962,131 (filed in 1975) describes the preparation of a new catalyst by reacting rhodium trichloride, sodium acetate, followed by reaction with triphenylphosphine and the hydrogenation of 6-deoxy-6-demethyl-6-methylene-5-hydroxytetracycline in its presence.

The present invention relates to the use of new homogeneous rhodium catalysts, the preparation of which are described in our co-pending patent application Ser. No. 458,068 filed on even date herewith.

These new catalysts are obtained by reacting a rhodium salt, preferably rhodium chloride, a tertiary phosphine, preferably triphenylphosphine, and an eventually substituted hydrazine, preferably hydrazine hydrate, in a reaction inert solvent. Alternatively, these catalysts can be prepared by reacting a known complex of rhodium and of a tertiary phosphine with a hydrazine in a reaction inert solvent. These nitrogen containing new rhodium catalysts are stereospecific, yielding nearly exclusively the α-isomer.

Thus, the present invention concerns the preparation of α-6-deoxytetracyclines by hydrogenating a compound of the formula:

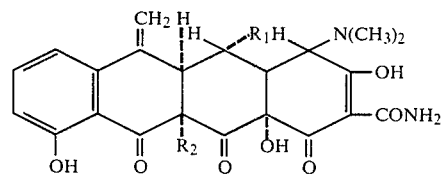

in which $R_1$ is hydrogen or hydroxy group and $R_2$ is hydrogen or chlorine, in a reaction inert solvent, in the presence of a tertiary phosphine-hydrazinochlororhodium complex as catalyst.

The pressure is not critical; it can be from atmospheric pressure upwards, however the preferred pressure range is from 4 to 10 kg/cm². The hydrogenation is carried out preferably at a temperature range from about 60° C. to 90° C. At lower temperatures, the reaction is too slow and above 100° C. decomposition takes place.

The reaction time is dependent on the amount of catalyst used and type of hydrogenation. A satisfactory reaction time is from about 3 to 10 hours, but satisfactory results and high yields can be obtained even after 16 hours of hydrogenation.

The starting material is added in the form of an acid addition salt, such as hydrochloride, p-toluenesulphonate, but other acid addition salts can be used provided that the acid is not a catalyst poison.

The 6-methylene-5-oxytetracycline (methacycline; MOT) can be prepared by any of the known processes but should not contain impurities which may act as catalyst poisons.

The hydrogenation is stopped when the rate of consumption of hydrogen drops drastically. The reaction mixture, once the hydrogenation is completed, containing nearly exclusively the α-isomer, does not contain unreacted starting material or only traces; the amount of by-products or degradation products is negligible and the β-isomer is less than 1%, usually it is around 0.1%.

It has been observed that the addition of a small amount, in the order of 0.01 to 0.06 mole/mole of a tertiary phosphine (preferably the same one contained in the catalyst used) to the reaction mixture, prior to starting hydrogenation, will accelerate the rate of hydrogen consumption, facilitate completion of the reaction and increase the yield up to 100%. The amount of the tertiary phosphine is critical and an excess above the amount indicated will reduce the yield. The optimum amount of additional tertiary phosphine can easily be determined for a given batch of catalyst by running a few experiments.

The purity of the reaction mixture thus obtained is such that the doxycycline can be crystallised directly from said reaction mixture by adding p-toluenesulphonic acid in excess, on condition that the solvent in the reaction medium is a non-solvent for the p-toluenesulphonate salt of doxycycline thus formed; such a solvent is preferably methanol. The purity so obtained is superior to 99% calculated on the dry basis.

The doxycycline p-toluenesulphonate can subsequently be transformed directly into the hydrochloride hemiethanolate hemihydrate by conventional processes with a yield near to stoichiometric.

Another inventive feature of the present invention is that the amount of rhodium necessary to achieve complete hydrogenation is drastically reduced in comparison to the amount used in the prior art processes.

Table I compares the amount of catalyst, yields and purity of the best examples of prior art processes with those of the present invention.

This table shows that the present invention not only surpasses in yield and purity the prior art processes but also the amount of rhodium necessary to hydrogenate a given amount of 6-methylene-oxytetracycline is reduced by 4 to 1000 times in relation to the prior art teaching. As rhodium is an extremely expensive noble metal, this reduction represents an important unexpected improvement, which, together with the nearly stoichiometric yield, results in a considerable reduction of manufacturing costs.

Furthermore, it has been found that the present invention is also applicable to transform 11a-halo-6-deoxy-6-demethyl-6-methylenetetracyclines into α-6-deoxytetracyclines in one reaction by dehalogenating at 11a- and simultaneously reducing the 6-methylene group. The yields and purity are very high and the results obtained demonstrate the considerable improvement over the prior art processes.

Chloromethacycline, prepared according to U.S. Pat. No. 3,849,491, is an eminently suitable starting material in the present invention.

To perform the reaction, an 11a-halo-6-deoxy-6-demethyl-6-methylenetetracycline, preferably 11a-chloro-6-deoxy-6-demethyl-6-methylene-oxytetracycline p-toluenesulphonate, is suspended in methanol in a conventional low pressure stainless steel hydrogenation apparatus, then a tertiary phosphinehydrazino-chlororhodium catalyst and an additional amount of tertiary phosphine are added under stirring and hydrogenated subsequently at about 60° C. to 90° C. at a pressure between 4 and 10 kg/cm$^2$ until the rate of consumption of hydrogen drops drastically. The reaction mixture is cooled down to about 45° C. and an excess of p-toluenesulphonic acid is added directly to the reaction mixture. It is allowed to cool down under stirring so as to reach a temperature of about 0° C. after 2 to 3 hours, then it is stirred for an additional hour, filtered and washed with methanol and acetone. The α-6-deoxyoxytetracycline p-toluenesulphonate thus obtained has a purity superior to 99% and does not contain any detectable amount of the β-isomer by circular paper chromatography.

The amount of the additional tertiary phosphine to be added cannot surpass 1 mole/mole, otherwise the yield will drop drastically.

Table II gives a comparison of the present invention with the state of art in transforming 11a-chloro-6-deoxy-6-demethyl-6-methylene-5-oxytetracycline into α-6-deoxyoxytetracycline.

TABLE I

| Patent No. | Example | Amount of rhodium used per kg. 6-methylene-oxytc. HCl | Stoichiometric yield of isolated product % | Content as α-6% | β-6% | Starting material % | Purity of isolated product % |
|---|---|---|---|---|---|---|---|
| U.S. Pat. No. 4,207,258 | 2 | 1954 mg. | 75.0 | N.S. | N.S. | N.S. | 99.3$^{(2)}$ |
| French Patent 2216268 | 3 | 21252 mg. | 90.6 | N.S. | N.S. | N.S. | N.S. |
| | 5 | 2125 mg. | 89.2 | N.S. | 0.6 | 0 | N.S. |
| | 9$^{(5)}$ | 556 mg. | 78.5 | 78.4 | 0.8 | 5.2 | 78.4 |
| U.S. Pat. No. 3,954,862 | 3 | 1962 mg. | 80.0 | 81.0* | 1.6* | N.S. | N.S. |
| | 8 | 19459 mg. | N.I. | 82.0* | 2.0* | 16.0 | N.I. |
| | 8 | 2 × 19459 mg. | N.I. | 95.0 | 2.0 | 0$^{(1)}$ | N.I. |
| U.S. Pat. No. 4,001,321 | 1 | 9369 mg. | 95.0 | 93.0 | 2.0–3.0* | N.S. | 93.0 |
| U.S. Pat. No. 3,962,131 | 2 | Less than 3332.4 mg.$^{(3)}$ | 98.8 | N.S. | N.S | N.S. | 99.7$^{(2)}$ |
| U.S. Pat. No. 3,907,890 | 5 | 0$^{(4)}$ | 75.2 | 98.0 | 2.0 | 0 | 98.0 |
| Present invention | 2 | 344.5 mg. | 90.0 | 99.5 | 0.45 | Traces | 99.5 |
| | 4 | 620.6 mg. | 99.1 | 99.89 | 0 | 0 | 99.89 |

*values in the reaction mixture.
N.S. — not stated.
N.I. — not isolated.
$^{(1)}$plus 3% of unknown substance.
$^{(2)}$by U.V. method.
$^{(3)}$Rh content not stated; possible limit calculated from Example 1.
$^{(4)}$It does not use Rh but cobalt carbonyl.
$^{(5)}$

TABLE II

| Patent No. | Example | Amount of rhodium used per kg. 11a-chloro MOT base | Stoichiometric yield of isolated product % | Content as α-6% | Content as β-6% | Content as Starting material % | Purity of isolated product % |
| --- | --- | --- | --- | --- | --- | --- | --- |
| U.S. Pat. No. 3,962,331 | 1 | 4889 mg | 70.1 | 95.0* | 5.0* | Slight traces* | 98.9 |
| French Patent 2216268 | 7 | 21752 mg | 78.8 | N.S. | 1.5–2* | N.S. | 89.0 |
|  | 14 | 2159 mg | 81.2 | N.S. | N.S. | N.S. | 88.29 |
| U.S. Pat. No. 3,954,862 | 17 | 2140 mg | 86.7 | 59.9 | 1.33 | 0.8 | 59.9 |
|  |  |  |  |  | 10 |  |  |
| Present invention | 3A | 346.1 mg | 84.2 | 99.8 | 0 | 0 | 99.8 |
|  | 13 | 378.4 mg | 90.7 | 99.6 | 0.3 | 0 | 99.6 |
|  | 16 | 224.6 mg | 85.9 | 99.65 | 0 | Traces | 99.65 |

*values in the reaction mixture.

The results clearly show the unexpected superiority of the new tertiary phosphine-hydrazino-chlororhodium complexes as hydrogenation catalysts not only concerning yields and purity but also in reducing the amount of rhodium necessary to complete the hydrogenation in relation to the prior art processes. The tertiary phosphine-hydrazino-chlororhodium complexes and their preparation are described in our co-pending patent application Ser. No. 458,068.

These new catalysts can be prepared either from a rhodium salt or from the already known tertiary phosphine rhodium complexes.

Thus, rhodium trichloride trihydrate (1 mole), a tertiary phosphine (1 to 2.5 moles) and an excess of hydrazine (up to 10 moles) are reacted, eventually by heating or refluxing them in a reaction inert solvent, such as a lower dialylketone, lower alcohol, tetrahydrofuran, dioxan or dimethylformamide, and the formed catalyst is then filtered off if it is insoluble in the reaction mixture or precipitated by adding a non-solvent, such as isopropylether, then filtered and dried.

Rhodium chloride trihydrate reacts with an excess of hydrazine hydrate, yielding a yellow compound which does not catalyse the hydrogenation of 6-methyleneoxytetracycline if triphenylphosphine is not added to the reaction mixture. In the presence of triphenylphosphine, however, a good quality α-6-deoxyoxytetracycline is obtained in high yield.

Alternatively, a tertiary phosphine rhodium complex (1 mole) can be reacted with an excess of hydrazine, substituted or not, the preferred catalyst being prepared by reacting tris(triphenylphosphine)chlororhodium (I) (1 mole) with an excess of hydrazine hydrate (3 moles) by stirring at room temperature in methanol. When the reaction mixture turns yellow, it is stirred for a few more minutes and it can be used either without isolation or it is filtered, washed and dried.

The following examples serve to illustrate the present invention, without in any way limiting the scope thereof.

EXAMPLE 1

Preparation of the catalyst: 0.48 ml of hydrazine hydrate was added to 3 g of tris(triphenylphosphine)-chlororhodium in 60 ml of ethanol and refluxed for 25 minutes. The original dark red colour changed to orange during the reaction. Upon cooling, 1.4 g precipitated (N 4.25%; Rh 16.95%). From the mother liquors, additional amounts were obtained by adding isopropylether.

Hydrogenation: 25 mg of the thus obtained catalyst in 20 ml of methanol was added to a stainless steel hydrogenation apparatus under magnetic stirring, containing 7.38 g of 6-methylene-5-hydroxytetracycline hydrochloride (MOT HCl) and 0.1 g of triphenylphosphine in 40 ml of methanol. After purging it with nitrogen, hydrogen was added at a pressure of 8 kg/cm² and heated up to 89° C. After 5h30m the consumption dropped, and 1 hour later it was cooled down. The reaction mixture was filtered through a G4 glass-filter, then 3.3 g of p-toluenesulphonic acid was added to the filtrate and stirred. The α-6-deoxyoxytetracycline p-toluenesulphonate thus formed was filtered, washed with acetone and dried. The product, which weighed 9.65 g, had the following analytical values: humidity 3.13% by the Karl-Fisher method, yield 98.4% and purity 99.8% on anhydrous basis. No β-isomer or starting material were detectable by circular paper chromatography ("Schleicher Schüll" paper Nr. 2045 B, 265 mm, ref. No. 381804; stationary phase: 100 ml of a solution of 0.1 M citric acid and 40 ml of 0.2 M anhydrous disodium phosphate were mixed to make a buffer with pH 3.5; mobile phase: nitromethane:chloroform:pyridine-20:10:3).

EXAMPLE 2

Example 1 was repeated but 15 mg of the catalyst was added instead of 25 mg. The α-6-deoxyoxytetracycline p-toluenesulphonate weighed 8.57 g. Yield 90%. It contained 0.45% of the β-isomer and traces of starting material.

EXAMPLE 3

(A) 15 mg of the triphenylphosphine-hydrazinochlororhodium complex, obtained according to Example 1, was added in 20 ml of methanol to a stainless steel hydrogenator containing 10 g of 11a-chloro-6-deoxy-6-demethyl-6-methylene-5-hdyroxytetracycline p-toluenesulphonate and 4 g of triphenylphosphine in 40 ml of methanol. Then it was flushed with nitrogen and filled with hydrogen to a pressure of 9.2 kg/cm² at 88° C. After 9h30m, it was cooled down and the reaction mixture was filtered. 3.3 g of p-toluenesulphonic acid was added and stirred for 2 hours. The crystals thus formed were filtered and washed. The α-6-deoxyoxytetracycline p-toluenesulphonate thus obtained weighed 8.0 g. Yield 84.2%. No β-isomer or starting material were detectable in the product by circular paper chromatography.

(B) Repetition of Example 3 (A) above with 10 mg of the same catalyst gave a yield of α-6-deoxyoxytetracycline p-toluenesulphonate of 7.82 g or 82.3%.

EXAMPLE 4

Preparation of the catalyst: It was performed as indicated in Example 1, however substituting ethanol by the same volume of n-butanol and stirring at room temperature for 20 minutes. The red colour turned orange during the reaction. Yield 1.43 g (N 6.21%, Rh 18.32%).

Hydrogenation: 25 mg of the catalyst thus obtained in 20 ml of methanol was added into a stainless steel hydrogenator containing 7.38 g of 6-methylene-5-hydroxytetracycline hydrochloride and 0.25 g triphenylphosphine in 40 ml of methanol. The hydrogenation and isolation were carried out as indicated in Example 1. The $\alpha$-6-deoxyoxytetracycline p-toluenesulphonate thus obtained weighed 9.95 g and had the following analytical values: loss on drying 5.32%, yield 99.14% and purity 99.89%, both on anhydrous basis. No $\beta$-isomer or starting material were detectable by circular paper chromatography.

EXAMPLE 5

Preparation of the catalyst: 0.16 ml of hydrazine hydrate was added to 1 g of tris(triphenylphosphine)-chlororhodium in 20 ml of isopropanol and stirred at room temperature for 45 minutes. The precipitated catalyst was filtered and dried.

Hydrogenation: The hydrogenation procedure as described in Example 1 was repeated using 25 mg of the catalyst as obtained hereinabove. The $\alpha$-6-deoxyoxytetracycline isolated as p-toluenesulphonate weighed 8.83 g and had the following analytical values: humidity 0.11% by Karl-Fisher, yield 92.82% and purity 99.9%, both on anhydrous basis.

EXAMPLE 6

25 mg of the catalyst as obtained in Example 5 in 20 ml of methanol was added to a stainless steel hydrogenator containing 7.38 g of 6-methylene-5-hydroxytetracycline hydrochloride in 40 ml of methanol. The hydrogenation and isolation were carried out as described in Example 1.

The $\alpha$-6-deoxyoxytetracycline p-toluenesulphonate thus obtained weighed 8.17 g and had the following analytical values: humidity 2.18% by Karl-Fisher, yield 84.1% and purity 99.2%, both on anhydrous basis.

EXAMPLE 7

Preparation of the catalyst: 0.32 ml of phenylhydrazine was added to 1 g of tris(triphenylphosphine)-chlororhodium in 20 ml of acetonitrile. It was heated to 65° C. for 25 minutes, whilst the product dissolved. The catalyst was precipitated by addition of isopropylether.

Hydrogenation: Example 1 was repeated using 25 mg of the catalyst obtained hereinabove. The $\alpha$-6-deoxyoxy tetracycline p-toluenesulphonate thus obtained weighed 8.33 g. Yield 87.6%. It did not contain any starting material or $\beta$-isomer by circular paper chromatography.

EXAMPLE 8

Preparation of the catalyst: 1 g of rhodium trichloride trihydrate in 5 ml of water was stirred for 1 hour at 70° C. Subsequently, a solution of 1.95 g of triphenylphosphine in 25 ml of acetone was added to it in 20 minutes, followed by the addition of 1.9 ml of hydrazine hydrate. It was refluxed for 3 hours and then stirred for 1 hour at 45° C. It was then filtered and washed with acetone and diethylether.

Hydrogenation: 17 ml of the catalyst hereinabove obtained in 13.5 ml of methanol was added to a stainless steel hydrogenator containing 5 g of 6-methylene-5-hydroxytetracycline hydrochloride in 27 ml of methanol. It was hydrogenated for 6h30m at 88° C. at a pressure between 8 and 9.2 kg/cm². 2.23 g of p-toluenesulphonic acid was added to the filtered reaction mixture and stirred for 2 hours. The crystals thus obtained were then filtered, washed with acetone and dried. The product weighed 5.4 g. Yield 83.9%. It contained slight traces of the $\beta$-isomer by circular paper chromatography. The mother liquors were then diluted with an equal volume of water and 4 g of sulphosalicylic acid was added. An additional 0.47 g of sulphosalicylate of doxycycline was obtained containing about 8% of the $\beta$-isomer and about 2% of decomposition product.

EXAMPLE 9

Example 8 was repeated but 68 mg of triphenylphosphine was also added to the reaction mixture prior to hydrogenation. The $\alpha$-6-deoxyoxytetracycline p-toluenesulphonate thus obtained weighed 5.36 g. Yield 83.3%. It contained traces of the $\beta$-isomer. The second crop as sulphosalicylate weighed 0.7 g and contained about 4% of the $\beta$-isomer.

EXAMPLE 10

Preparation of the catalyst: 0.5 g of rhodium trichloride trihydrate in 2.5 ml of water was heated for 1 hour at 70° C. under stirring and 0.8962 ml of hydrazine hydrate was added portionwise in 9.24 ml of acetone. After refluxing for 3 hours, it was cooled down and the crystals were filtered off.

Hydrogenation: The hydrogenation was carried out as described in Example 1 using 25 mg of the catalyst hereinabove prepared. The $\alpha$-6-deoxyoxytetracycline p-toluenesulphonate thus obtained weighed 7.96 g. Yield 83.8%. It contained about 1.5% of the $\beta$-isomer. The mother liquors were then diluted with an equal volume of water and 4 g of sulphosalicyclic acid was added. An additional 1.55 g of sulphosalicylate of doxycycline was obtained, which contained about 93% of the $\alpha$-isomer and 7% of the $\beta$-isomer.

EXAMPLE 11

Example 10 was repeated but no triphenylphosphine was added to the hydrogenation reaction mixture. There was no consumption of hydrogen and the 6-methylene-5-hydroxytetracycline remained unchanged.

EXAMPLE 12

Preparation of the catalyst: 0.5 g of rhodium trichloride trihydrate was heated for 1 hour at 70° C. in 2.5 ml of water. Subsequently, 0.98 g of triphenylphosphine was added in 12.5 ml of methylethylketone. It was stirred for 10 minutes and 3.37 g of benzenesulphonylhydrazine was added. It was heated to 67° C. during 3 hours under stirring and for an additional hour at 45° C. It was filtered, washed with methylethylketone and diethylether and dried.

Hydrogenation:

(A) 25 mg of the catalyst hereinabove obtained was used for repeating Example 1. The $\alpha$-6-deoxyoxytetracycline p-toluenesulphonate thus obtained weighed 8.57 g. Yield 90%. No $\beta$-isomer or starting material were detectable by circular paper chromatography.

(B) 25 mg of the above catalyst in 20 methanol was added to a stainless steel hydrogenator containing 10 g of 11a-chloro-6-deoxy-6-demethyl-6-methylene-5-hydroxytetracycline p-toluenesulphonate and 4 g of triphenylphosphine in 40 ml of methanol. It was flushed with nitrogen and filled with hydrogen to a pressure of 9 kg/cm² at 88° C. After 6h30m, the hydrogenator was cooled down and the reaction mixture was filtered. 3.3 g of p-toluenesulphonic acid was added to the filtrate and stirred for 2 hours. The crystals were filtered, washed with acetone and dried. The α-6-deoxyoxytetracycline p-toluenesulphonate thus obtained weighed 8.27 g. Yield 87.0%. No β-isomer or starting material were detectable by circular paper chromatography.

EXAMPLE 13

Preparation of the catalyst: 8 μl of hydrazine hydrate was added to a suspension of 50 mg of tris(triphenylphosphine)chlororhodium in 10 ml of methanol and stirred at room temperature for a few minutes until a change of the colour of the reaction mixture occured.

Hydrogenation: the above catalyst was added without isolation to 20 g of 11a-chloro-6-deoxy-6-demethyl-6-methylene-5-hydroxytetracycline p-toluene sulphonate and 8 g of triphenylphosphine in 105 ml of methanol.

Subsequently, the above mixture was hydrogenated between 87° and 88.5° C. at a pressure of 8 kg/cm² during 6 hours. The reaction mixture was then cooled down to about 45° C. and 6.7 g of p-toluenesulphonic acid was added under stirring. It was stirred for further 2 hours and cooled to 0° C. It was then filtered, washed with 2×5.5 ml of methanol and 2×5.5 ml of acetone and dried. The α-6-deoxyoxytetracycline p-toluenesulphonate thus obtained weighed 17.23 g. Yield 90.7%. The content of β-isomer was 0.3% and no starting material was present by h.p.l.c. (Column: μ Bondapak "Waters" CN—ref. No. PN 84042 S/N; solvent: 80% of tetrahydrofuran, 20% of a mixture containing 80% of water, 20% acetic acid in 0.001M EDTA; flow rate: 2.5 ml/min.; detection: U.V. 268 nm; 1.0 AUFS; chart: 5 mm/min.).

EXAMPLE 14

Preparation of the catalyst: 0.08 ml of hydrazine hydrate was added to 0.5 g of tris(triphenylphosphine)-chlororhodium in 10 ml of isopropanol and refluxed for 25 minutes. Then it was cooled down and filtered. The catalyst thus obtained 14.1% of rhodium.

Hydrogenation: Example 12 (B) was repeated using 25 mg of the tripenylphosphine-hydrazino-chlororhodium complex obtained hereinabove. The α-6-deoxyoxytetracycline p-toluenesulphonate thus obtained weighed 8.02 g. Yield 84.4%. No β-isomer or starting material were detectable by circular paper chromatography.

EXAMPLE 15

Preparation of the catalyst: 0.5 g of rhodium trichloride trihydrate was heated to 70° C. for 1 hour in 2.5 ml of water under nitrogen atmosphere. Then 0.975 g of triphenylphosphine was added in 12.5 ml of methylethylketone, followed by 0.95 ml of hydrazine hydrate. After refluxing for 3 hours, followed by stirring at 45° C. during 1 hour, it was cooled and the crystals filtered, wahsed and dried.

Hydrogenation: Example 12 (B) was repeated using 25 mg of the catalyst obtained hereinabove. the α-6-deoxyoxytetracycline p-toluenesulphonate thus obtained weighed 8.04 g. Yield 84.6%. No β-isomer and no starting material were detectable by circular paper chromatography.

EXAMPLE 16

Preparation of the catalyst: 0.6 ml of a methanolic solution of hydrazine hydrate (0.394 ml/100 ml) was added under stirring to 15 mg of tris (triphenylphosphine)chlororhodium (Rh content 11.0%) in 20 ml of methanol and stirred for a few minutes until a colour change occurred.

Hydrogenation: The above reaction mixture of the catalyst was added to a stainless steel hydrogenator containing 10 g of 11a-chloro-6-deoxy-6-demethyl-6-methylene-5-hydroxytetracycline p-toluenesulphonate and 4 g of triphenylphosphine in 40 ml of methanol. It was flushed with nitrogen, then hydrogenated at a pressure of 9.2 kg/cm² at 88° C. for 9 hours. It was then cooled down and filtered. Subsequently, 3.3 g of p-toluenesulphonic acid was added and the mixture stirred for 2 hours and filtered. The α-6-deoxyoxytetracycline p-toluenesulphonate thus formed weighed 8.16 g. Yield 85.9%. No β-isomer was detectable and slight traces of starting material were present in circular paper chromatography.

We claim:

1. A new improved homogeneous hydrogenation process to prepare α-6-deoxytetracyclines in high yield and purity from a 6-deoxy-6-demethyl-6-methylenetetracycline or salt thereof in the presence or absence of a tertiary phosphine or from a 11a-chloro-6-deoxy-6-demethyl-6-methylenetetracycline or a salt thereof in the presence of a tertiary phosphine by catalytic hydrogenation, characterised in that the catalyst is a tertiary phosphine-hydrazino-chlororhodium obtained by reacting a rhodium salt or a complex with a hydrazine or salt thereof.

2. Process according to claim 1, wherein for each part of substrate to be hydrogenated the amount of rhodium metal in the catalyst necessary to perform the hydrogenation is less than 0.0007 part.

3. Process according to claim 1 wherein the rhodium salt or complex is tris(triphenylphosphine)chlororhodium and the hydrazine or a salt thereof is hydrazine.

4. Process according to claim 1 wherein the rhodium salt or complex is tris(triphenylphosphine)chlororhodium and the hydrazine or salt thereof is phenyl hydrazine.

5. Process according to claim 1 wherein the rhodium salt or complex there of is rhodium trichloride trihydrate and the hydrazine or salt thereof is hydrazine.

6. Process according to claim 1 wherein the catalyst is the reaction product of rhodium trichloride trihydrate, triphenylphosphine and benzenesulphonylhdyrazine.

7. Process according to claim 1 wherein 6-deoxy-6-demethyl-6-methylene-tetracycline or salt thereof is hydrogenated in the presence of said catalyst and 0.01–0.06 mole of tertiary phosphine per mole of tertiary phosphine of said catalyst.

8. Process according to claim 7 wherein the tertiary phosphine in the catalyst and the additional tertiary phosphine in which the reaction is carried out in the presence of are the same.

9. Process according to claim 1 in which a 11a-chloro-6-deoxy-6-demethyl-6-methylenetetracycline or a salt thereof is hydrogenated in the presence of said catalyst and up to 1 mole of tertiary phosphine per mole of tertiary phosphine in said catalyst.

10. Process according to claim 9 wherein the tertiary phosphine in the catalyst and the additional tertiary phosphine in which the reaction is carried out in the presence of are the same.

11. Process according to claim 1 wherein 6-deoxy-6-demethyl-6-methylenetetracycline or salt thereof is hydrogenated.

12. Process according to claim 1, wherein the pure α-6-deoxytetracycline formed is recovered directly from the reaction mixture as crystalline p-toluenesulfonate by addition of an excess of p-toluenesulfonic acid.

13. Process according to claim 2, wherein the pure α6-deoxytetracycline formed is recovered directly from the reaction mixture as crystalline p-toluenesufonate by addition of an excess of p-toluenesulfonic acid.

14. Process according to claim 3, wherein the pure α6-deoxytetracycline formed is recovered directly from the reaction mixture as crystalline p-toluenesolufonate by addition of an excess of p-toluenesulfonic acid.

15. Process according to claim 4, wherein the pure α6-deoxytetracycline formed is recovered directly from the reaction mixture as crystalline p-toluenesulfonate by addition of an excess of p-toluenesulfonic acid.

16. Process according to claim 5, wherein the pure α6-deoxytetracycline formed is recovered directly from the reaction mixture as crystalline p-toluenesulfonate by addition of an excess of p-toluenesulfonic acid.

17. Process according to claim 6, wherein the pure α6-deoxytetracycline formed is recovered directly from the reaction mixture as crystalline p-toluenesulfonate by addition of an excess of p-toluenesulfonic acid.

18. Process according to claim 7, wherein the pure α6-deoxytetracycline formed is recovered directly from the reaction mixture as crystalline p-toluenesulfonate by addition of an excess of p-toluenesulfonic acid.

19. Process according to claim 8, wherein the pure α6-deoxytetracycline formed is recovered directly from the reaction mixture as crystalline p-toluenesulfonate by addition of an excess of p-toluenesulfonic acid.

20. Process according to claim 9, wherein the pure α6-deoxytetracycline formed is recovered directly from the reaction mixture as crystalline p-toluenesulfonate by addition of an excess of p-toluenesulfonic acid.

* * * * *

UNITED STATES PATENT AND TRADEMARK OFFICE
CERTIFICATE OF CORRECTION

PATENT NO. : 4,500,458
DATED : February 19, 1985
INVENTOR(S) : Ivan Villax et al It is certified that error appears in the above-identified patent and that said Letters Patent are hereby corrected as shown below:

In Table I appearing in columns 3-4, first entry in the third column, for "1954" read --19540--;
in the last line of the footnotes, after "(5)" read --combined first and second fractions--.

Signed and Sealed this

Twenty-fourth Day of December 1985

[SEAL]

Attest:

DONALD J. QUIGG

Attesting Officer　　　Commissioner of Patents and Trademarks